United States Patent
Yan et al.

(10) Patent No.: US 10,633,839 B2
(45) Date of Patent: Apr. 28, 2020

(54) RAPID INSTALLATION STRUCTURE OF WEIGHT ASSEMBLY

(71) Applicant: Xiamen Forbetter Sanitary Ware Co., Ltd., Xiamen, Fujian (CN)

(72) Inventors: Xiliang Yan, Xiamen (CN); Yihui Chen, Xiamen (CN)

(73) Assignee: XIAMEN FORBETTER SANITARY WARE CO., LTD., Xiamen, Fujian (CN)

( * ) Notice: Subject to any disclaimer, the term of this patent is extended or adjusted under 35 U.S.C. 154(b) by 125 days.

(21) Appl. No.: 15/961,884

(22) Filed: Apr. 25, 2018

(65) Prior Publication Data
US 2018/0328008 A1    Nov. 15, 2018

(30) Foreign Application Priority Data
May 15, 2017   (CN) .................... 2017 2 0535842 U

(51) Int. Cl.
  *E03C 1/04*   (2006.01)
  *F16K 27/12*  (2006.01)
  *F16L 55/07*  (2006.01)
  *F16L 3/10*   (2006.01)

(52) U.S. Cl.
  CPC .......... *E03C 1/0401* (2013.01); *E03C 1/0404* (2013.01); *F16K 27/12* (2013.01); *F16L 55/07* (2013.01); *E03C 1/04* (2013.01); *E03C 2001/0415* (2013.01); *F16L 3/1075* (2013.01)

(58) Field of Classification Search
  CPC .. E03C 1/0401; E03C 2001/0415; E03C 1/04; B60R 16/0215; E05D 13/10; E05D 13/14; F16K 27/12; F16L 55/07

USPC ................ 16/2.1, 2.3, 2.4, 218, 400, DIG. 8
See application file for complete search history.

(56) References Cited

U.S. PATENT DOCUMENTS

| | | | | |
|---|---|---|---|---|
| 5,771,934 A * | 6/1998 | Warshawsky | ......... | E03C 1/0401 137/801 |
| 5,960,832 A * | 10/1999 | Warshawsky | ......... | E03C 1/0401 137/801 |
| 6,250,338 B1 * | 6/2001 | Dempsey | .................. | E03C 1/04 137/801 |
| 6,738,996 B1 * | 5/2004 | Malek | .................. | B05B 1/1618 239/441 |
| 6,757,921 B2 * | 7/2004 | Esche | ...................... | E03C 1/04 137/625.4 |
| 7,534,965 B1 * | 5/2009 | Thompson | ............... | H02G 3/22 16/2.1 |

(Continued)

*Primary Examiner* — Roberta S Delisle
(74) *Attorney, Agent, or Firm* — Leong C. Lei

(57) ABSTRACT

A rapid installation structure of a weight assembly is disclosed. The weight assembly includes a left weight body and a right weight body to mate with each other. First sides of the left weight body and the right weight body are fixedly connected through a connecting plate. Opposite second sides of the left weight body and the right weight body are clasped through a locking buckle. The left weight body includes a left weight and a left casing covering the left weight, and is formed with a left mating face. The right weight body includes a right weight and a right casing covering the right weight, and is formed with a right mating face. The locking buckle includes an engaging buckle and an engaging recess to mate with each other. The engaging buckle and the engaging recess are disposed on the left and right mating faces, respectively.

10 Claims, 4 Drawing Sheets

(56) References Cited

U.S. PATENT DOCUMENTS 8,763,175 B2 * 7/2014 Li .................... E03C 1/0402
137/359

* cited by examiner

RAPID INSTALLATION STRUCTURE OF WEIGHT ASSEMBLY

BACKGROUND OF THE INVENTION

1. Field of the Invention

The present invention relates to a bathroom accessory, and more particularly to a weight assembly used for a pull-out faucet.

2. Description of the Prior Art

When the sprayer of a pull-out faucet is pulled out of a fixed seat of the faucet, the hose at the distal end is moved along with the movement of the sprayer. In general, the hose is provided with a weight in an appropriate position according to the length of the hose. Through the weight, the sprayer of the pull-out faucet can be quickly returned to the fixed seat of the faucet after use. A conventional weight is made of a metal material and composed of one or two plates. The middle of the weight has a through hole for accommodating the hose. Finally, the weight is locked by a fastener (such as a bolt) to clamp the hose tightly. This structure has the problem that the assembly and disassembly of the weight and the position adjustment are inconvenient. Another conventional weight is a combination of a plastic casing and a metallic block, which also consists of two parts. First sides of the two parts are connected through a hinge, and opposite second sides of the two parts are connected through a locking buckle. Although the installation of the structure is convenient, the locking buckle protrudes beyond the surface of the weight. When the hose is moved along with the sprayer of the pull-out faucet, the locking buckle may interfere with other pipe fittings under the countertop to affect the movement of the pull-out faucet. Accordingly, the inventor of the present invention has devoted himself based on his many years of practical experiences to solve these problems.

SUMMARY OF THE INVENTION

In order to overcome the shortcomings of the conventional weight structure, the primary object of the present invention is to provide a quick installation structure of a weight assembly to achieve simple operation, quick disassembly and assembly and smooth movement.

In order to achieve the aforesaid object, a rapid installation structure of a weight assembly is provided. The weight assembly includes a left weight body and a right weight body to mate with each other. First sides of the left weight body and the right weight body are fixedly connected through a connecting plate. Opposite second sides of the left weight body and the right weight body are clasped through a locking buckle. The left weight body includes a left weight and a left casing covering the left weight. The left weight body is formed with a left mating face. The right weight body includes a right weight and a right casing covering the right weight. The right weight body is formed with a right mating face. The locking buckle includes an engaging buckle and an engaging recess to mate with each other. The engaging buckle and the engaging recess are disposed on the left and right mating faces, respectively. The engaging buckle and the engaging recess are clasped to lock the left weight body and the right weight body together.

Preferably, an outer wall of the left casing or the right casing is provided with a cutout structure.

Preferably, the left weight body and the right weight body are provided with limiting structures. The limiting structures are a limiting protrusion and a limiting hole to mate with each other. The limiting protrusion and the limiting hole are disposed close to two sides of the connecting plate of the left weight body and the right weight body, respectively.

Preferably, middle portions of the left and right mating faces are formed with recesses respectively, and the two recesses are matched to form a through hole for a hose to pass therethrough.

Preferably, the recesses are provided with gaskets for holding the hose.

Preferably, the gaskets are provided with antiskid protrusions thereon.

Preferably, the connecting plate is integrally formed with the left casing and the right casing.

Preferably, the left weight and the right weight are metal structures.

Preferably, the left casing and the right casing are plastic structures.

Preferably, the left weight of the left weight body is covered by the left casing through a left positioning sleeve; and the right weight of the right weight body is covered by the right casing through a right positioning sleeve.

Preferably, a left counterbore is defined in the left positioning sleeve, and the left gasket is provided with a corresponding left protruding block. Aright counterbore is defined in the right positioning sleeve, and the right gasket is provided with a corresponding right protruding block.

By adopting the above structure, the weight assembly of the present invention is composed of two weight bodies mated with each other and clasped by a locking buckle, without the use of fasteners and any tools. The present invention has the advantages of simple and quick installation, single-handed operation, quick assembly and disassembly, thereby effectively improving the work efficiency. In particular, the engaging buckle and the engaging recess are disposed on the left and right mating faces of the left and right weight bodies, so the locking buckle does not protrude beyond the surface of the weight assembly. The weight assembly will not interfere with other pipe fittings under the countertop when the pull-out faucet is moved, thus ensuring the smooth movement of the pull-out faucet.

DETAILED DESCRIPTION OF THE PREFERRED EMBODIMENTS

Embodiments of the present invention will now be described, by way of example only, with reference to the accompanying drawings.

Figure 1:
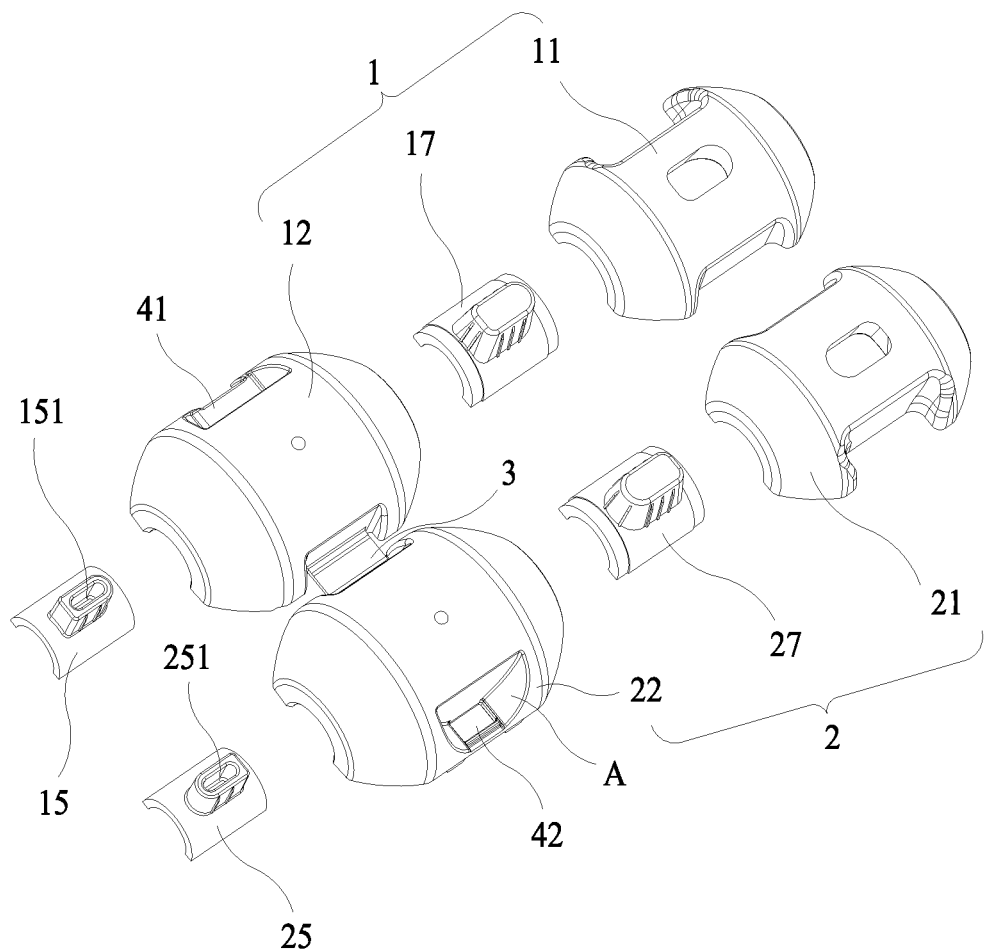
FIG. 1 is an exploded view of the present invention.
Figure 2:
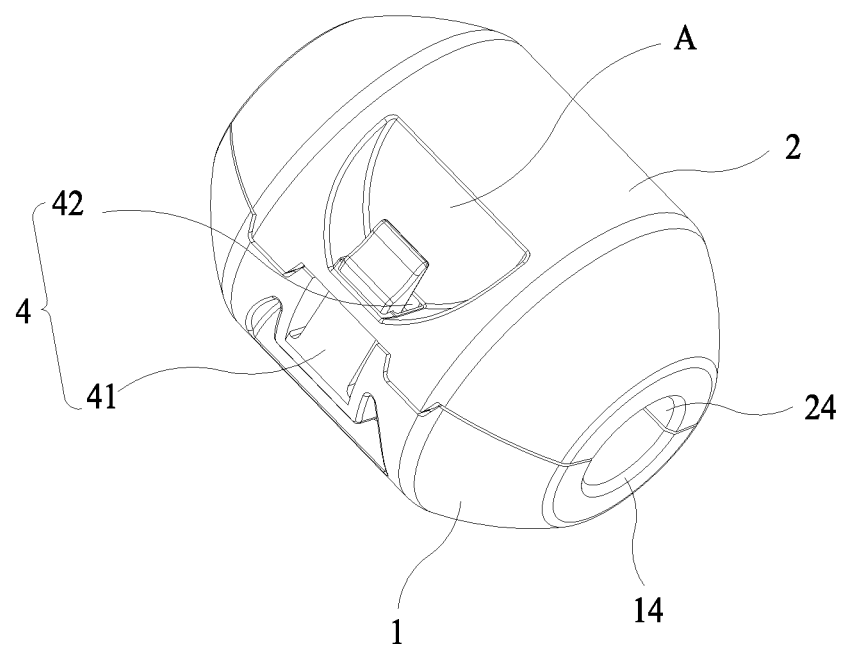
FIG. 2 is a perspective view of the present invention.
Figure 3:
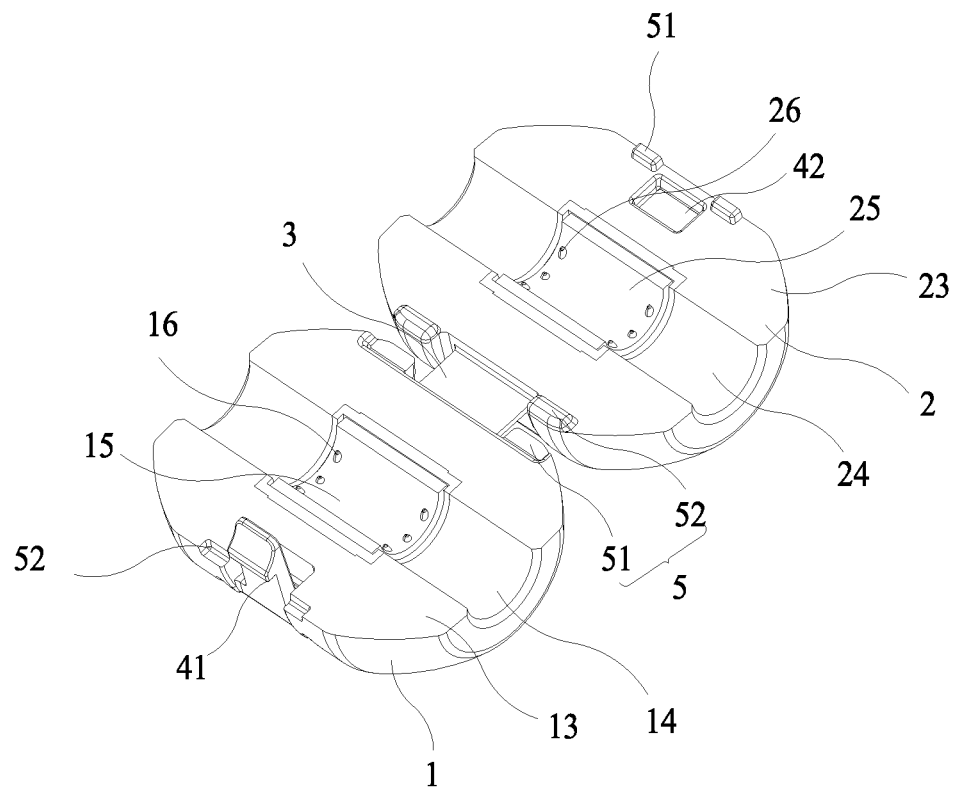
FIG. 3 and FIG. 4 are schematic views of the present invention, showing the weight assembly in an open state.
Figure 4:
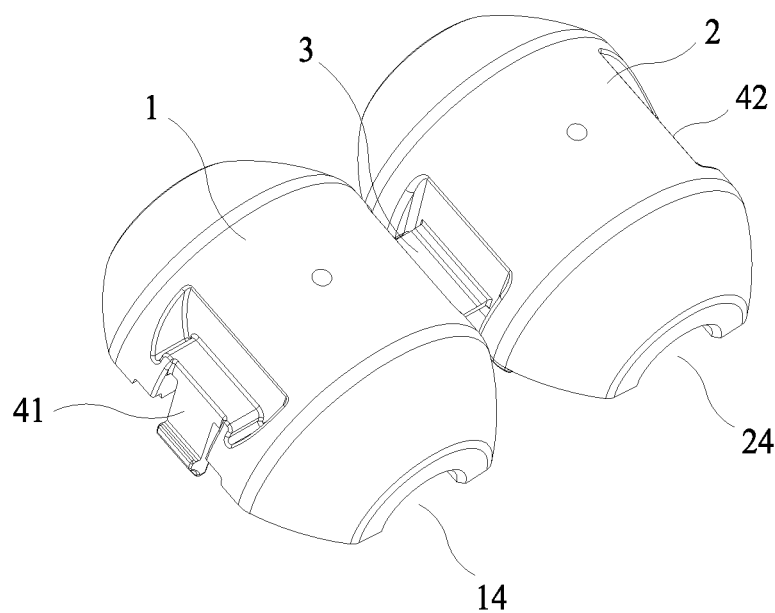
Figure 5:
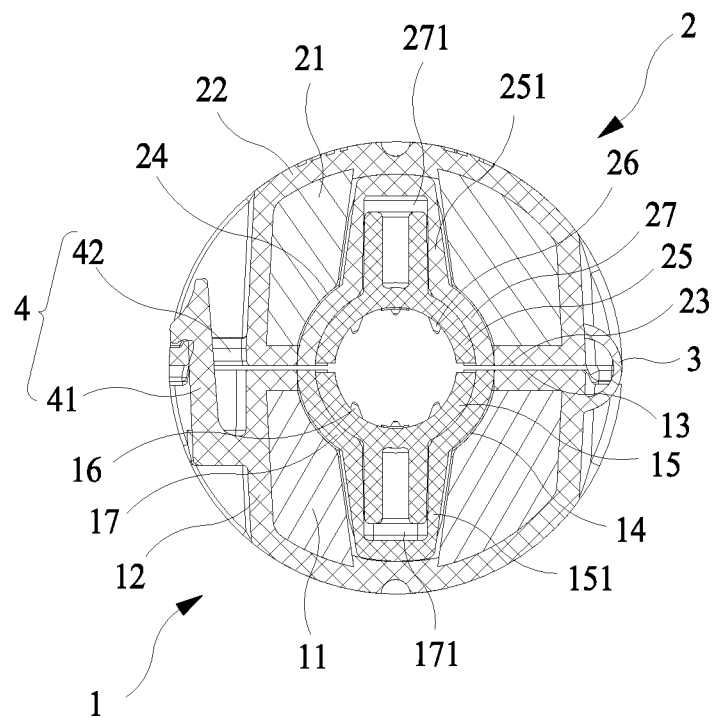
FIG. 5 is a cross-sectional view of the weight assembly of the present invention.
Figure 6:
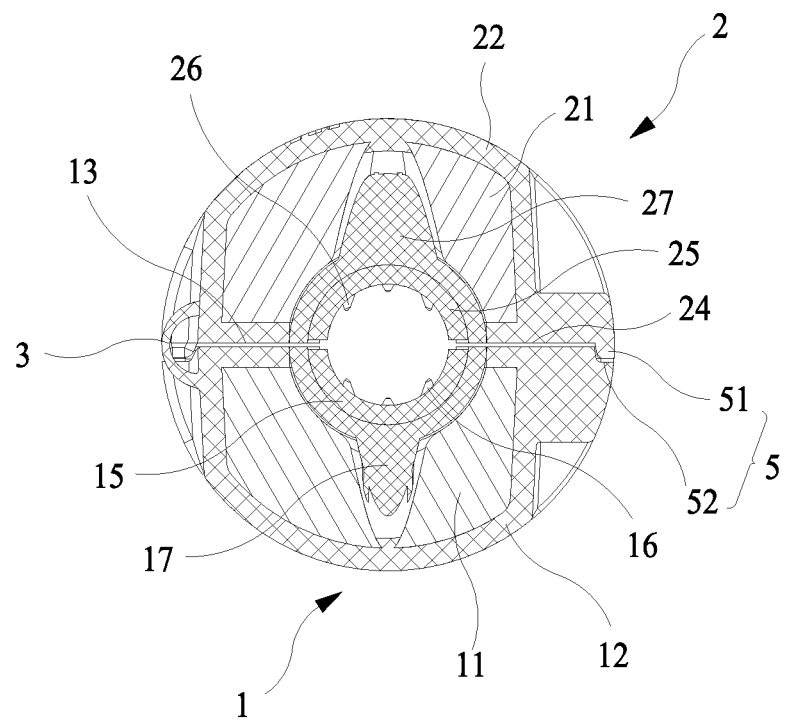
FIG. 6 is another cross-sectional view of the weight assembly of the present invention.

As shown in FIG. 1 to FIG. 6, the present invention discloses a rapid installation structure of a weight assembly. The weight assembly may be applied to a pull-out faucet, as an example. The weight assembly consists of a left weight body 1 and a right weight body 2 to mate with each other. First sides of the left weight body 1 and the right weight body 2 are fixedly connected through a connecting plate 3. Opposite second sides of the left weight body 1 and the right weight body 2 are clasped through a locking buckle 4. The left weight body 1 includes a left weight 11 and a left casing 12 covering the left weight 11, and is formed with a left mating face 13. The right weight body 2 includes a right weight 21 and a right casing 22 covering the right weight 21, and is formed with a right mating face 23. The connecting plate 3 is integrally formed with the left casing 12 and the right casing 22. The middle portions of the left mating face 13 of the left weight body 1 and the right mating face 23 of the right weight body 2 are formed with a left recess 14 and a right recess 24, respectively. The left recess 14 and the right recess 24 are matched to form a through hole for a hose to pass therethrough. The left recess 14 and the right recess 24 are provided with a left gasket and a right gasket 25 for holding the hose tightly. The inner surfaces of the left gasket 15 and the right gasket 25 are provided with antiskid protrusions 16, 26, respectively. The left weight 11 of the left weight body 1 is covered by the left casing 12 through a left positioning sleeve 17. A left counterbore 171 is defined in the middle of the left positioning sleeve 17 for receiving a left protruding block 151 provided on the outer surface of the left gasket 15. The right weight 21 of the right weight body 2 is covered by the right casing 22 through a right positioning sleeve 27. Aright counterbore 271 is defined in the middle of the right positioning sleeve 27 for receiving a right protruding block 251 provided on the outer surface of the right gasket 25. The arrangement of the left and right counterbores 171, 271 ensures the accuracy of the cooperation between the left gasket 15 and the right gasket 25 and avoids assembly by mistake.

The locking buckle 4 includes an engaging buckle 41 and an engaging recess 42 to mate with each other. The engaging buckle 41 and the engaging recess 42 are respectively disposed on the left and right mating faces 13, 23 of the left weight body 1 and the right weight body 2 opposite the connecting plate 3. The engaging buckle 41 and the engaging recess 42 are clasped to lock the left weight body 1 and the right weight body 2 together. One of the left and right mating faces 13, 23 is provided with the engaging buckle 41, and the other mating face is provided with the engaging recess 42. The outer wall of the left casing 12 or the right casing 22 is provided with a cutout structure A corresponding in position to the engaging recess 42 for the front end of the engaging buckle 41 to be elastically clasped in the engaging recess 42.

Furthermore, the left weight body 1 and the right weight body 2 are provided with limiting structures 5. The limiting structures are a limiting protrusion 51 and a limiting hole 52 to mate with each other. The limiting protrusion 51 and the limiting hole 52 are disposed close to two sides of the connecting plate 3 of the left weight body 1 and the right weight body 2, so that the left weight body 1 and the right weight body 2 do not shake back and forth as well as left and right after being mated with each other.

The left weight 11 and the right weight 21 are metal structures. The left casing 12 and the right casing 22 are plastic structures.

During installation, the left weight body 1 and the right weight body 2 are in a semi-open state with the first sides connected to each other, and the hose is placed in the left and right recesses 14, 24. After the proper position is determined, the weight assembly is grasped, and the engaging buckle 41 and the engaging recess 42 provided on the left and right mating faces 13, 23 are automatically buckled, and the left weight body 1 and the right weight body 2 are mated with each other to hold the hose tightly, meanwhile, the limiting structures 5 disposed on the left and right mating faces 13, 23 are also automatically mated with each other.

By adopting the above structure, the weight assembly of the present invention is composed of two weight bodies mated with each other and clasped by a locking buckle, without the use of fasteners and any tools. The present invention has the advantages of simple and quick installation, single-handed operation, quick assembly and disassembly, thereby effectively improving the work efficiency. In particular, the engaging buckle and the engaging recess are disposed on the left and right mating faces of the left and right weight bodies, so the locking buckle does not protrude beyond the surface of the weight assembly. The weight assembly will not interfere with other pipe fittings under the countertop when the pull-out faucet is moved, thus ensuring the smooth movement of the pull-out faucet.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A weight assembly, comprising a left weight body and a right weight body to mate with each other, first sides of the left weight body and the right weight body being fixedly connected through a connecting plate, opposite second sides of the left weight body and the right weight body being clasped through a locking buckle, wherein the left weight body includes a left weight and a left casing covering the left weight, the left weight body is formed with a left mating face, the right weight body includes a right weight and a right casing covering the right weight, the right weight body is formed with a right mating face; the locking buckle includes an engaging buckle and an engaging recess to mate with each other, the engaging buckle and the engaging recess are disposed on the left and right mating faces respectively, the engaging buckle and the engaging recess are clasped to lock the left weight body and the right weight body together;

wherein the left weight of the left weight body is covered by the left casing through a left positioning sleeve; and the right weight of the right weight body is covered by the right casing through a right positioning sleeve.

2. The weight assembly as claimed in claim 1, wherein an outer wall of the left casing or the right casing is provided with a cutout structure.

3. The weight assembly as claimed in claim 1, wherein the left weight body and the right weight body are provided with limiting structures, the limiting structures are a limiting protrusion and a limiting hole to mate with each other, and the limiting protrusion and the limiting hole are disposed close to two sides of the connecting plate of the left weight body and the right weight body, respectively.

4. The weight assembly as claimed in claim 1, wherein middle portions of the left and right mating faces are formed with recesses respectively, and the two recesses are matched to form a through hole for a hose to pass therethrough.

5. The weight assembly as claimed in claim 4, wherein the recesses are provided with gaskets for holding the hose.

6. The weight assembly as claimed in claim 5, wherein the gaskets are provided with antiskid protrusions thereon.

7. The weight assembly as claimed in claim 1, wherein the connecting plate is integrally formed with the left casing and the right casing.

8. The weight assembly as claimed in claim 1, wherein the left weight and the right weight are metal structures.

9. The weight assembly as claimed in claim 1, wherein the left casing and the right casing are plastic structures.

10. The weight assembly as claimed in claim 1, wherein a left counterbore is defined in the left positioning sleeve, the left gasket is provided with a left protruding block; a right counterbore is defined in the right positioning sleeve, and the right gasket is provided with a right protruding block.

\* \* \* \* \*